Patented July 29, 1930

1,771,550

UNITED STATES PATENT OFFICE

CHARLES G. QUIGLEY, OF GARFIELD, UTAH

REAGENT FOR USE IN CONCENTRATION OF ORES

No Drawing.   Application filed August 8, 1928. Serial No. 298,400.

This invention relates to reagents, and particularly to frothing agents, for use in the concentration or ores, minerals and the like by means of froth flotation, and to the method of making such reagents. The method of effecting the concentration of ores with the use of such reagents is described and claimed in a separate application filed of even date herewith.

The principal objects of this invention are to provide a novel class of frothing agents having a certain general composition and to provide a novel method of preparing such reagents.

It has been found, according to the present invention, that the metallic salts of the so-called organic sulphuric acids are excellent frothers, and, when used in conjunction with any other reagents that may be necessary, give a good froth, producing a clean concentrate, and, furthermore, that they do not interfere in any way with the selective properties of certain well known reagents used to effect differential or selective flotation.

The salts of organic sulphuric acids above referred to have the following general formula: $M(RSO_4)_n$ in which R is a monovalent organic radical and M an alkali forming metal with a valence of $n$. R may also be a polyvalent organic radical, and in this case the above formula is modified according to the valence thereof.

The structural formula of these compounds, when R is a monovalent organic radical and M a monovalent metal, may be written:

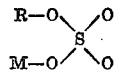

These compounds may in general be considered as compounds of sulphuric acid, in which one of the hydrogen atoms is replaced by an organic radical and the other by a metal. Such a compound may, therefore, be defined as a mixed sulphate of an organic radical and a metal, and may be considered as a metallic salt of the organic sulphuric acid.

These compounds may in general be prepared by first treating an organic compound containing the desired radical with sulphuric acid of suitable concentration; the product of this reaction is an organic sulphuric acid (or organic acid sulphate) and may be used as a frothing agent in this form, but if it is desired to prepare a metallic salt thereof in accordance with the present invention, the resulting mixture, after cooling, may be added slowly to an aqueous solution or suspension of a suitable salt of the desired metal. The desired product, which is a mixed sulphate of a metal and the organic radical, may be separated by any suitable method, for example as hereinafter described.

The frothing agents of the above general composition may be used in substantially the same manner as other frothing agents for the purpose of effecting the desired concentration of the ore or other material, and such agents may be employed in conjunction with any other desired reagents and in any desired proportions. The process consists in general in adding to a suspension or pulp of the ore to be treated and water the desired proportion of frothing agent and any other desired flotation or conditioning reagents, subjecting the pulp to suitable agitation and removing therefrom the froth which is formed and which rises to the top of the pulp.

The following may be given as a specific example of one method of forming a frothing reagent of my invention: I may prepare calcium amyl sulphate, $Ca(C_5H_{11}SO_4)_2$, by treating amyl alcohol with the theoretical quantity of ordinary concentrated sulphuric acid, cooling the resulting mixture, and pouring it slowly into a suspension of calcium carbonate in a small amount of water, such suspension preferably containing a sufficient excess of calcium carbonate to neutralize any free acid in said mixture. I do not wish to be limited to any exact proportions of reagents, but may use, for example, approximately 110 cc. of amyl alcohol (of a purity of 95% or more), approximately 53 cc. of concentrated sulphuric acid (containing about 95% $H_2SO_4$) and about 65 grams of calcium carbonate.

When the mixture obtained by addition of the amyl sulphuric acid to the calcium carbonate suspension becomes substantially neutral, said mixture is filtered. The filtrate contains calcium amyl sulphate in solution, from which it can be recovered if desired by evaporating off the water.

Other salts of calcium can, of course, be used in place of the carbonate. For example, calcium acetate or calcium hypochlorite may be used, or in general a salt of a weak acid.

I may prepare sodium amyl sulphate, $NaC_5H_{11}SO_4$, by treating the mixture of the amyl alcohol and sulphuric acid, which contains amyl sulphuric acid, with a solution of sodium carbonate and adding ethyl alcohol to the resulting mixture. The sodium sulphate and any excess carbonate precipitate out or separate in the form of a saturated solution. The alcoholic solution contains the sodium amyl sulphate which may be recovered by evaporation at a low temperature to avoid hydrolysis.

Similar compounds of other alkali forming metals, such as potassium, may be made by this method, using the carbonate or other salts.

In place of the amyl alcohols, other alcohols or olefines may be used. The concentration of the sulphuric acid and rate of mixing should be modified according to the nature of the alcohol or olefine to be treated. The alcohols require more concentrated acid than the corresponding olefines. As examples of using olefines; cyclohexene, a cyclic mono-olefine was treated with the theoretical amount of an 81% solution of sulphuric acid and when the reaction was apparently complete the mixture was poured into a suspension of calcium carbonate, as described with calcium amyl sulphate.

I have also found that compounds of this same general composition and suitable for use as frothing agents may be prepared by treating a hydrocarbon or petroleum acid sludge containing organic sulphuric acids, with a metallic salt in the presence of water. A reagent of this sort may be prepared, for example, by pouring kerosene acid sludge slowly into an aqueous suspension of calcium carbonate and recovering the resulting salt or ester in substantially the same manner as above described for recovering the calcium amyl sulphate. By "acid sludge" I mean the sludge formed during the refining of kerosene or other hydrocarbon or petroleum product with sulphuric acid, such sludge being separated from the hydrocarbon, as by settling, and comprising organic sulphuric acids of different compositions, formed by reaction of the sulphuric acid with various unsaturated hydrocarbons or olefines contained in the hydrocarbon product. The frothing agents formed therefrom by the above treatment consist of mixed sulphates obtained from such unsaturated hydrocarbons and the particular metal whose salt was employed in the process of making same. The use of such an acid sludge for the production of frothing agents is of particular advantage as large quantities of such a sludge are produced in the petroleum refining industry and are either discarded as a waste product or must be treated for the recovery of acid therefrom. Such sludge, therefore, forms a cheap source of organic sulphuric acids for use according to my invention.

As an example of one method of utilizing a frothing agent of the present invention in carrying out a flotation operation, and the results obtained thereby, the following test may be given: Utah Copper Company ore, which is ground in the plant with water and lime, is thickened and enough of the thickened pulp is added to the flotation machine to give 500 grams of dry ore. 250 mg. of lime is then added and the mixture is agitated for two minutes. 62.5 mg. of crude sodium cyanide is added and agitated for two minutes. One drop of alcohol treated with phosphorus pentasulphide and 70 mg. of calcium amyl sulphate are added and agitated one minute and then the mixture is diluted with water and the froth removed for seven minutes. The following are the average of four tests, using the above procedure:

|  | Per cent Cu | Per cent Fe | Per cent Ins. |
| --- | --- | --- | --- |
| Heading | .919 | 2.18 |  |
| Rougher tailing | .072 | 1.37 |  |
| Rougher concentrate | 22.062 | 19.95 | 26.15 |
| Indicated extraction (per cent) | 92.47 |  |  |
| Radio of concentration | 25.93 |  |  |

The specific procedure above described is given only by way of example and many modifications may be made therein. For example, the proportion of the above described frothing agents may be varied between wide limits, depending upon the character of the ore being treated and the degree of frothing required. Furthermore, such frothing agents may be employed in conjunction with any other flotation agents or chemical conditioning agents instead of those given in the above example, and while the above test was carried out in an alkaline pulp, it will be understood that the invention is not limited in this respect and that the frothing agents of my invention may, if desired, be used in neutral or acid pulp.

I claim:

1. A frothing agent for use in concentration of ores comprising a mixed sulphate of an organic radical and an alkali forming metal.

2. A frothing agent for use in concentration of ores comprising a mixed sulphate of an alkyl radical and an alkali forming metal.

3. A frothing agent for use in the concentration of ores comprising a mixed sulphate of an alkyl radical and an alkali forming metal.

4. A frothing agent for use in concentration of ores comprising a mixture of alkali forming metal salts of various organic sulphuric acids derived from hydrocarbon acid sludge.

In testimony whereof I have hereunto subscribed my name this 19th day of July, 1928.

CHARLES G. QUIGLEY.